No. 631,688. Patented Aug. 22, 1899.
W. D. WILLIAMS.
VALVED COUPLING FOR TRAIN PIPES.
(Application filed June 10, 1899.)
(No Model.) 2 Sheets—Sheet 1.
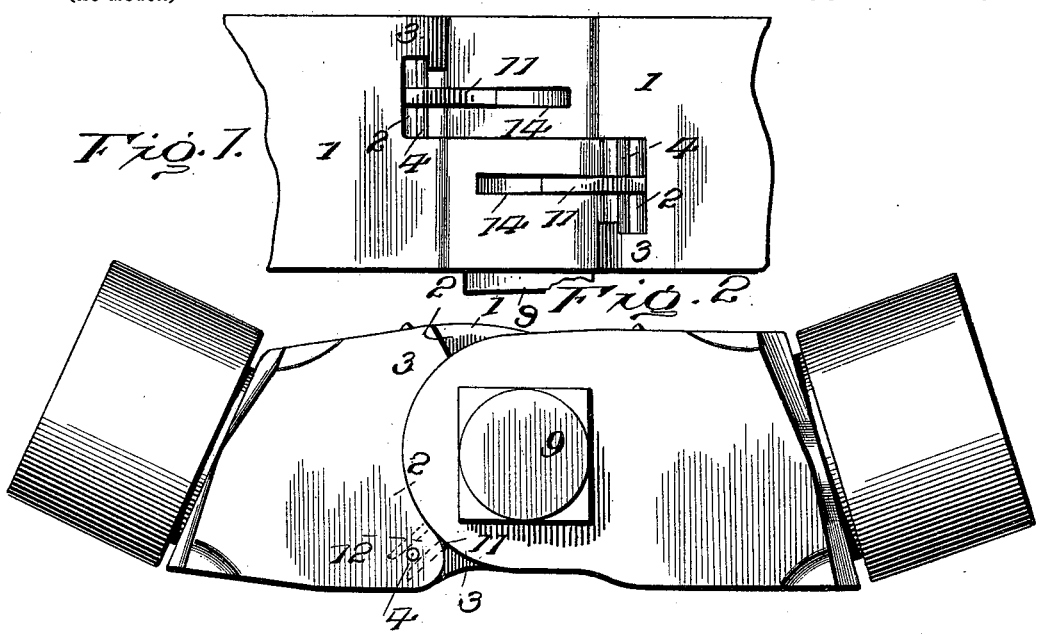
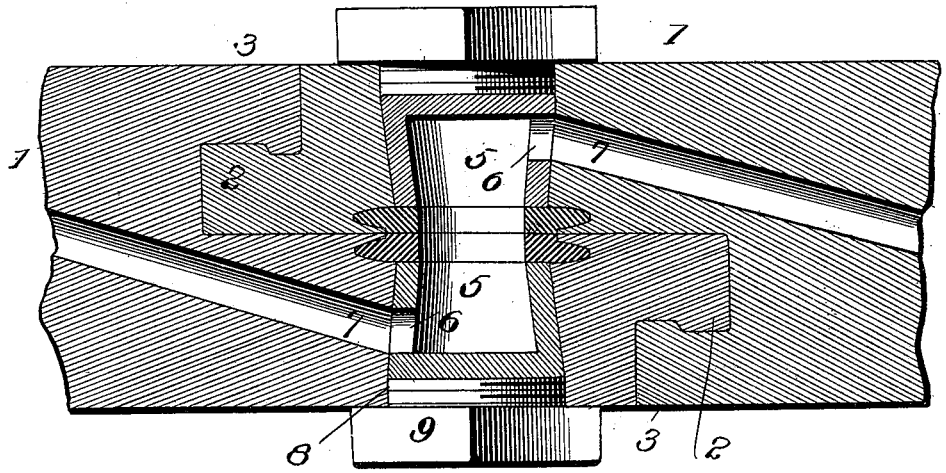

No. 631,688. Patented Aug. 22, 1899.
W. D. WILLIAMS.
VALVED COUPLING FOR TRAIN PIPES.
(Application filed June 10, 1899.)
(No Model.) 2 Sheets—Sheet 2.
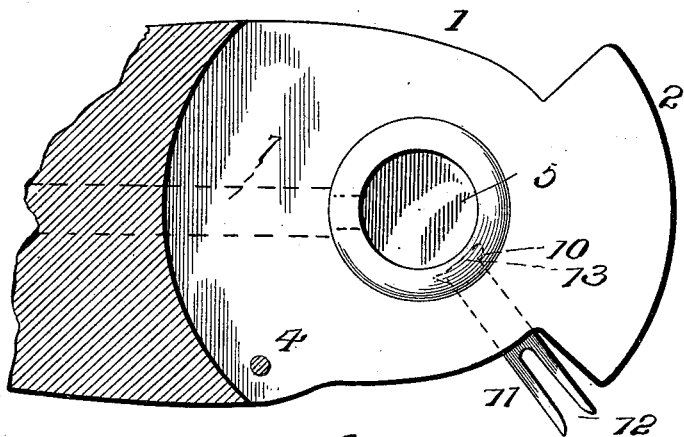
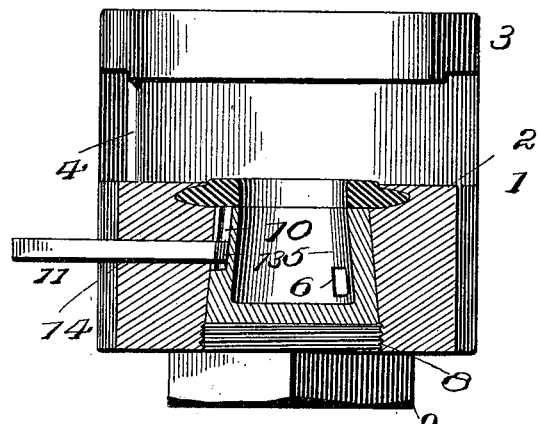

UNITED STATES PATENT OFFICE.

WIN D. WILLIAMS, OF FREDERICKSBURG, VIRGINIA, ASSIGNOR OF ONE-HALF TO JOHN H. STEPHENS, OF VERNON, TEXAS.

VALVED COUPLING FOR TRAIN-PIPES.

SPECIFICATION forming part of Letters Patent No. 631,688, dated August 22, 1899.

Application filed June 10, 1899. Serial No. 720,088. (No model.)

*To all whom it may concern:*

Be it known that I, WIN D. WILLIAMS, a citizen of the United States, residing at Fredericksburg, in the county of Spottsylvania and State of Virginia, have invented certain new and useful Improvements in Valved Couplings for Train-Pipes; and I do hereby declare the following to be a full, clear, and exact description of the invention, such as will enable others skilled in the art to which it appertains to make and use the same.

The air-pipes of automatic brake systems for railway-cars, heating-pipes, and train-pipes generally are for the most part connected by couplings attached to the terminals of short lengths of hose or flexible tubing, the couplings being mounted and disconnected by a relatively rotary movement, which effects a clutch or a releasing of the engaging devices, according to the direction of movement of the parts.

This invention relates to the type of couplings hereinbefore mentioned and combines therewith valves which are simultaneously actuated with and by the movement of the couplings, opening to establish communication between the pipes of adjacent cars when coupled and closing to prevent wasting of the air, steam, or other medium when said parts are disconnected.

The object of the invention is the provision of a valved coupling which can be used in connection with the valveless couplings commonly and most generally used without requiring the slightest change or addition to the old coupling, thereby producing a saving in time and expense in the installation of the improved coupling, which can be gradually introduced as the old couplings become worn or unfitted for further effective service, the old style and the new couplings working as well together as like couplings either of the valved or valveless type.

Couplings of the valved class obviate the necessity of the attendant or brakeman going beneath the car to open or shut the cock provided to control the flow of the air, steam, or other medium passing through the pipe and enables said cocks to be dispensed with, so that interference with the system by unauthorized persons is reduced to a minimum and the liability of the trainmen forgetting to open the cocks when coupling the pipes done away with.

For a full understanding of the merits, advantages, and details of construction of the invention reference is to be had to the following description and drawings hereto attached.

In order to show the invention in the form susceptible of general application, it is illustrated as applied to a coupling of well-known form and construction. However, it is to be understood that various changes in the form, proportions, and minor details of construction may be resorted to without departing from the spirit or sacrificing any of the advantages of the invention.

The invention consists, primarily, of the novel features, details of construction, and combinations of the parts, which hereinafter will be more fully set forth, illustrated, and finally claimed.

In the drawings, Figure 1 is a bottom plan view of a coupling showing the application of the invention. Fig. 2 is a side view. Fig. 3 is a longitudinal section. Fig. 4 is a detail section of a coupling member parallel with the meeting faces of the coupling. Fig. 5 is a transverse section. Fig. 6 is a side view showing the parts ready for coupling.

Corresponding and like parts are referred to in the following description and indicated in all the views of the drawings by the same reference characters.

The coupling, as previously stated, is of ordinary construction and is composed of members or parts 1, having clutch members or catches 2 and 3 and pins 4, extending across the space formed between the clutch members 2 and the meeting faces of the coupling, said pins being disposed at one end of the clutch members 2. Hollow valves 5 are fitted into the transverse seats or passages formed in the matching ends of the coupling members and are rotatable and formed with ports 6 to register with the passages 7 of the coupling. These valves taper slightly and are fitted into the members 1 by being passed through openings 8, formed in said members and registering with the seats of the valves. These openings 8 are closed at their outer ends by plugs 9, which are threaded therein and bear against the valves and hold them firmly seated.

A channel 10 is formed in a side of each valve 5 and extends a short distance from the open end of the valve and is of wedge form in cross-section, the side walls of the channel being undercut. An arm 11, having its outer end bifurcated, as shown at 12, is secured to each valve 5 by having its inner end 13 made of wedge form corresponding to the cross-sectional outline of the channel 10 and interlocking therewith. A slot 14 is formed in each part of the coupling, and the arm 11 is thrust in said slot with its wedge-shaped end 13 in the path of the channel 10, so as to enter therein when inserting the valve through the opening 8. The bifurcated end 12 of the arm projects beyond the side of the coupling and is adapted to engage with the pin 4 of the companion member of the coupling, so as to operate the valve simultaneously with engaging or disuniting the parts of the coupling. The slot 14 and arm 11 are disposed in such a manner as to admit of the bifurcated ends of the arms engaging with the pins 4 opposite the spaces formed between the clutch members or catches 2 and the opposing parts of the coupling. The arms 11 project from the same side of the coupling when its parts are united. Hence the projecting terminals of said arms can be readily engaged with the pins 4 when it is required to bring the parts of the coupling into position for connecting the ends of the train-pipes of adjacent cars.

The valves and their ports are so disposed that when the members are uncoupled the ports 6 will be out of registry with the passages 7, and when the members are coupled said ports and passages will be in register and afford communication between the train-pipes of coupled cars. When the members 1 are fitted together, the pins 4 enter the spaces formed between the bifurcations of the projecting terminals of the arms 11, and when said members are rotated to effect engagement of the clutch members 2 the arms 11 are simultaneously operated and move the valves 5 so as to bring their ports in coincident relation with the passages 7. When the members 1 are uncoupled, the reverse movement takes place, the valves 5 being operated to throw their ports out of register with the passages 7, thereby shutting off communication and preventing wasting of the medium passing through the pipes.

Having thus described the invention, what is claimed as new is—

1. A coupling comprising corresponding members having clutch projections and pins at the terminals of corresponding clutch projections, a valve seated in the meeting face of the coupling member and having a lateral port to register with the passage thereof, and an arm applied to said valve and passing through a slot formed longitudinally of said member parallel with its meeting face and having its projecting end bifurcated and adapted to engage with the pin of the companion member whereby the valve is actuated simultaneously with the coupling and uncoupling of the device, substantially as set forth.

2. In a coupling of the type provided with corresponding clutch members and pins and adapted to be coupled and uncoupled by a relative rotation of the parts, a valve seated in the meeting face of one of the members and having a port to register with the passage of said member, and an arm located in a longitudinal slot formed in said member parallel with the meeting face thereof and having its projecting end bifurcated to engage with the pin of the opposite coöperating member of the coupling and having its inner end constructed to interlock with the valve when placing the latter in position, substantially as set forth.

3. In a coupling of the type set forth, a valve seated in the meeting face of the coupling and having a channel in its side, said coupling having a longitudinal slot communicating with the valve-seat and extending parallel with the meeting face of the coupling, and an arm located in the slot of the coupling and having its outer end projecting beyond the coupling and bifurcated and having its inner end projecting into the valve-seat and seated in the channel of the valve and interlocking therewith, substantially as set forth.

4. In a coupling of the class described, a valve seated in the meeting face of the coupling and having a channel in its side of approximately wedge form in cross-section and extending longitudinally of the valve and opening through its outer end, said coupling having a longitudinal slot parallel with the meeting face of the coupling, and an arm fitted in said longitudinal slot having its outer end bifurcated and its inner end of approximately wedge form and extending into the valve-seat and adapted to interlock with the valve by entering the channel thereof when placing the valve in position, substantially as specified.

5. A coupling of the type described composed of corresponding members provided with clutch projections and pins and having longitudinal slots parallel with their meeting faces, valves seated in the members of the coupling and adapted to be passed through openings extending through the outer sides of the coupling, plugs closing the outer ends of said openings and holding the valves seated, and arms having their outer ends bifurcated to receive the aforesaid pins and having their inner ends adapted to interlock with the valve by a sliding action when placing said valves in position, said arms being located in the aforementioned longitudinal slots, substantially as described.

In testimony whereof I affix my signature in presence of two witnesses.

WIN D. WILLIAMS. [L. S.]

Witnesses:
ALBERT B. BOTTS,
JOHN H. ROBINSON.